US010098091B2

(12) United States Patent
Seol et al.

(10) Patent No.: US 10,098,091 B2
(45) Date of Patent: Oct. 9, 2018

(54) METHOD AND APPARATUS FOR TRACKING UPLINK BEAMS IN BEAMFORMING-BASED WIRELESS COMMUNICATION SYSTEM

(71) Applicant: Samsung Electronics Co., Ltd., Gyeonggi-do (KR)

(72) Inventors: Ji-Yun Seol, Gyeonggi-do (KR); Tae-Young Kim, Gyeonggi-do (KR); Hyun-Kyu Yu, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 163 days.

(21) Appl. No.: 13/744,162

(22) Filed: Jan. 17, 2013

(65) Prior Publication Data
US 2013/0182683 A1    Jul. 18, 2013

(30) Foreign Application Priority Data
Jan. 17, 2012    (KR) .......................... 10-2012-0005032

(51) Int. Cl.
*H04W 72/04*    (2009.01)
(52) U.S. Cl.
CPC ......... *H04W 72/04* (2013.01); *H04W 72/046* (2013.01)
(58) Field of Classification Search
CPC .................................................... H04W 72/04
USPC ........................................................ 370/335
See application file for complete search history.

(56) References Cited

U.S. PATENT DOCUMENTS

| 2009/0067513 | A1 | 3/2009 | Kim et al. |
| 2011/0007721 | A1 | 1/2011 | Taghavi Nasrabadi et al. |
| 2011/0076955 | A1 | 3/2011 | Uno et al. |
| 2011/0113137 | A1* | 5/2011 | Ramachandran et al. ..... 709/224 |
| 2012/0026978 | A1* | 2/2012 | Jung .................. H04W 36/385 370/331 |
| 2012/0320874 | A1* | 12/2012 | Li et al. ........................ 370/331 |

(Continued)

FOREIGN PATENT DOCUMENTS

| EP | 1 912 454 A1 | 4/2008 |
| KR | 10-2005-0106657 | 11/2005 |
| WO | WO 2010/037132 A2 | 4/2010 |

(Continued)

OTHER PUBLICATIONS

International Search Report dated Apr. 24, 2013 in connection with International Patent Application No. PCT/KR2013/000362.

(Continued)

*Primary Examiner* — Huy D Vu
*Assistant Examiner* — Kevin Cunningham

(57) ABSTRACT

A method and apparatus perform Uplink (UL) beam tracking in a beamforming-based wireless communication system. A Mobile Station (MS) repeatedly transmits code sequences mapped respectively to MS transmit beams through each MS transmit beam as many times as the number of Base Station (BS) receive beams while sweeping the MS transmit beams. The MS receives, from a BS, transmit beam information indicating at least one best transmit beam selected from the MS transmit beams by the BS, and allocation information used to allocate UL resources for UL feedback. The MS transmits best beam information indicating the at least one best transmit beam and a MS identifier to the BS using the UL resources.

28 Claims, 8 Drawing Sheets

(56) References Cited

U.S. PATENT DOCUMENTS

2012/0327872 A1* 12/2012 Han ............................ 370/329

FOREIGN PATENT DOCUMENTS

WO    WO 2010/066280 A1    6/2010
WO    WO 2010/145929 A1    12/2010

OTHER PUBLICATIONS

Written Opinion of International Searching Authority dated Apr. 24, 2013 in connection with International Patent Application No. PCT/KR2013/000362.

Extended European Search Report dated Aug. 6, 2015 in connection with European Patent Application No. 13738518.3; 8 pages.

"IEEE Standard for Local and Metropolitian Area Networks Part 16: Air Interface for Broadband Wireless Access Systems"; IEEE Std 802.16TM-2009; May 29, 2009; 2070 pages.

Motorola; "Uplink Sounding for Obtaining MIMO Channel Information at Node B in E-UTRA"; 3GPP TSG RAN WG1 #44; R1-060668; Denver, CO; Feb. 13-17, 2006; 6 pages.

\* cited by examiner

METHOD AND APPARATUS FOR TRACKING UPLINK BEAMS IN BEAMFORMING-BASED WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean Patent Application filed in the Korean Intellectual Property Office on Jan. 17, 2012 and assigned Serial No. 10-2012-0005032, the entire disclosure of which is incorporated herein by reference.

TECHNICAL FIELD OF THE INVENTION

The present disclosure relates generally to a wireless communication system operating based on beamforming, and more particularly, to a method and apparatus for selecting and tracking beams for an Uplink (UL).

BACKGROUND OF THE INVENTION

In order to meet the increasing demands for wireless data traffic, wireless communication systems have been developed to support a higher data rate. For an increase in the data rate, the wireless communication systems have been evolved to improve the spectral efficiency based on the communication technologies such as Orthogonal Frequency Division Multiple Access (OFDMA) and Multiple Input Multiple Output (MIMO). However, the tremendous demands for wireless data traffic may not be met only with the improvement of the spectral efficiency.

Recently, the increase in demands for smart phones and tablet computers and the explosive growth in the number of applications requiring a large amount of traffic have accelerated the demands for data traffic. A method for meeting these demands is to use more frequency resources over a wider frequency band. Therefore, in order to secure a wider frequency band and apply the wider frequency band to wireless mobile communication, there is a need to consider securing an ultra-wideband frequency in the higher-frequency domain.

Wireless communication in the millimeter Wave (mmWave) band may suffer from an increase in the propagation loss such as path loss and return loss due to the frequency characteristics of the mmWave band. Because of the increase in the propagation loss, the arrival distance of radio waves is reduced causing a reduction in coverage. On the other hand, the wavelength may be significantly reduced due to the mmWave band, so it may be easy to apply beamforming that uses a plurality of small antennas. Accordingly, it is possible to seek a new way to increase the arrival distance of radio waves and the coverage by mitigating the path loss of radio waves by applying the beamforming technology to the wireless communications in the mmWave band.

Transmit beamforming is generally a method of increasing directivity by concentrating arrival areas of radio waves in a specific direction using a plurality of antennas. A set of multiple antennas is called an antenna array, and each antenna included in the antenna array is called an array element. The antenna array may have a variety of types, including a linear array and a planar array. With the use of the transmit beamforming, the transmission distance may be increased due to the increase in directivity of signals, and signals are not transmitted in directions other than a specific direction, so signal interference to users other than the user associated with the specific direction may be significantly reduced.

A receiving side may also perform beamforming on received signals using a receive antenna array. A receiver may increase the sensitivity of signals received in a specific direction by concentrating received radio waves in the specific direction, and blocking interference signals by excluding signals received in directions other than the specific direction from the received signal.

In a UL of the existing cellular system, an operation is performed to adjust UL transmit timing and power of a Mobile Station (MS) to match with receive timing and receive dynamic range of a Base Station (BS) using UL Ranging (RNG) or Random Access Channel (RACH) at and/or after initial network entry. In the existing cellular system that basically considers equi-directional or omni-directional transmission of MSs, focuses have been made on the adjustment of transmit timing and/or power using UL RNG or RACH, and its associated protocol and signaling technologies have been mainly developed.

In contrast, as to the recent prior arts in the beamforming-based cellular system, technology for transmitting beam selection information for a Downlink (DL) and the transmission procedure that considers beamforming during initial network entry have been mainly researched, but there has been little development in the technology for supporting UL beamforming.

SUMMARY OF THE INVENTION

To address the above-discussed deficiencies of the prior art, it is a primary object to provide a method and apparatus for supporting UL beamforming in a beamforming-based wireless communication system.

Another aspect of exemplary embodiments of the present disclosure is to provide a method and apparatus for solving the problems which may occur due to the anonymity of UL RNG or RACH during UL multiple access by beamforming in a beamforming-based wireless communication system.

Further another aspect of exemplary embodiments of the present disclosure is to provide a method and apparatus for efficiently supporting adjustment of transmit beams which undergo different multipath path losses during UL multiple access by beamforming in a beamforming-based wireless communication system.

In accordance with one aspect of the present disclosure, there is provided a method for performing Uplink (UL) beam tracking in a beamforming-based wireless communication system. The method includes repeatedly transmitting code sequences mapped respectively to Mobile Station (MS) transmit beams through each MS transmit beam as many times as the number of Base Station (BS) receive beams while sweeping the MS transmit beams; receiving, from a BS, transmit beam information indicating at least one best transmit beam selected from the MS transmit beams by the BS, and allocation information used to allocate UL resources for UL feedback; and transmitting best beam information indicating the at least one best transmit beam and a MS identifier to the BS using the UL resources.

In accordance with another aspect of the present disclosure, there is provided a method for performing Uplink (UL) beam tracking in a beamforming-based wireless communication system. The method includes receiving code sequences transmitted from different Mobile Station (MS) transmit beams through each Base Station (BS) receive beam while sweeping BS receive beams; selecting at least one best transmit beam among the MS transmit beams based on a channel state measured for the code sequences; transmitting, to a MS, transmit beam information indicating the at least one best transmit beam and allocation information used to allocate UL resources for UL feedback; and receiving best beam information indicating the at least one best transmit beam and a MS identifier from the MS using UL resources.

In accordance with further another aspect of the present disclosure, there is provided a Mobile Station (MS) apparatus for performing Uplink (UL) beam tracking in a beamforming-based wireless communication system. The MS apparatus includes a transmitter; a receiver; and a controller for controlling the transmitter and the receiver. The transmitter repeatedly transmits code sequences mapped respectively to MS transmit beams through each MS transmit beam as many times as the number of Base Station (BS) receive beams while sweeping the MS transmit beams. The receiver receives, from a BS, transmit beam information indicating at least one best transmit beam selected from the MS transmit beams by the BS, and allocation information used to allocate UL resources for UL feedback. The transmitter transmits best beam information indicating the at least one best transmit beam and a MS identifier to the BS using the UL resources.

In accordance with yet another aspect of the present disclosure, there is provided a Base Station (BS) apparatus for performing Uplink (UL) beam tracking in a beamforming-based wireless communication system. The BS apparatus includes a transmitter; a receiver; and a controller for controlling the transmitter and the receiver. The receiver receives code sequences transmitted from different Mobile Station (MS) transmit beams through each BS receive beam while sweeping BS receive beams. The transmitter transmits, to a MS, transmit beam information indicating at least one best transmit beam that is selected from the MS transmit beams based on a channel state measured for the code sequences, and allocation information used to allocate UL resources for UL feedback. The receiver receives best beam information indicating the at least one best transmit beam and a MS identifier from the MS using UL resources.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

Figure 1:
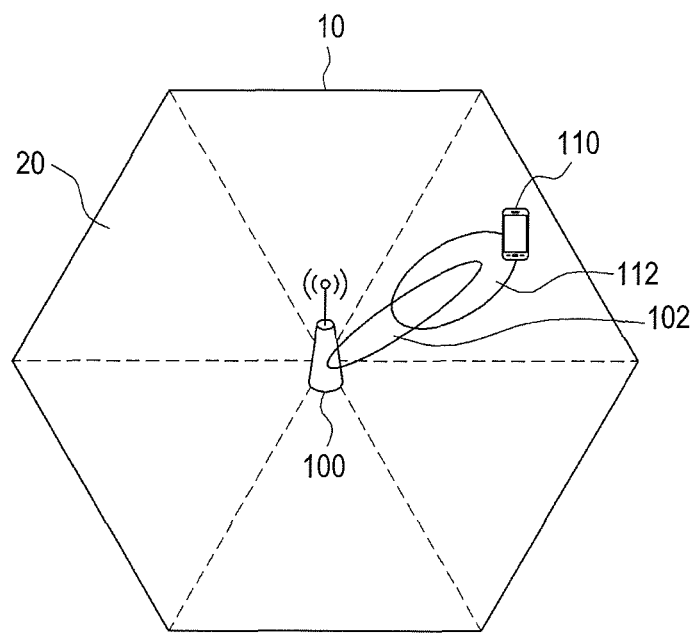
FIG. 1 illustrates a beamforming-based signal transmission/reception scenario according to an embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Preferred embodiments of the present disclosure will now be described in detail with reference to the accompanying drawings. In the following description, specific details such as detailed configuration and components are merely provided to assist the overall understanding of exemplary embodiments of the present disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

In an mmWave wireless communication system operating based on beamforming, beamforming for maximizing the beam gain both in a DL and a UL needs to be operated to overcome the significant propagation loss and penetration loss which may occur due to the channel propagation characteristics of the mmWave band. Beamforming in the UL is achieved based on the pair of MS's transmit beamforming and BS's receive beamforming, and is accompanied by a process of selecting an best beam pair among one or more MS transmit beams and BS receive beams which occur in several different directions depending on the structure of the MS and the BS, allowing both the MS and the BS to recognize information about the beam pair.

In the UL of the wireless communication system operating based on beamforming, UL RNG or RACH is used for UL beam tracking to select the best beam pair for MS's transmit beams and BS's receive beams. The UL beam tracking shares beam pair information for MS transmit beams and BS receive beams between a MS and a BS in a 3-way handshaking way, and performs fast UL synchronization during UL beam switching using MS's transmit beam adjustment information which is based on the beam pair for MS transmit beams and BS receive beams.

To this end, the UL beam tracking may include the following detailed description.

- A BS delivers best MS transmit beam information (e.g., MS transmit beam ID) and best BS receive beam information (e.g., BS receive beam ID) mapped thereto, which indicate M best pairs of MS transmit beams and BS receive beams, to a MS that transmitted a UL ranging code, based on the detection of the UL ranging code using a message such as Ranging Response (RNG-RSP).
- A BS delivers best UL transmit/receive beam information to a MS, and performs allocation of UL bandwidth (BW), which is to be used to feed back BS's receive beam pair information mapped to each MS transmit beam, from the MS to the BS.
- A MS delivers MS's best pair information of MS transmit beams and BS receive beams mapped thereto, to the BS along with the MS's MS ID using the UL BW allocated from the BS.
- A BS determines the best MS transmit beam and BS receive beam information in a UL of the MS from the MS ID and best transmit/receive beam pair information received from the MS.
- A BS, when delivering best transmit/receive beam information to a MS, delivers, to the MS, transmit beam adjustment information for adjustment of timing and power of MS transmit beams, which is based on each pair of MS transmit beams and BS receive beams.
- A MS performs appropriate transmit/receive beam adjustment according to the change in beam pair during UL beam switching, based on the MS's transmit beam adjustment information, which is received from the BS and associated with the UL beam pair, thereby performing fast UL synchronization.

FIG. 1 illustrates a beamforming-based signal transmission/reception scenario according to an embodiment of the present disclosure.

Referring to FIG. 1, a BS 100 has one cell 10 and a service area consisting of six sectors 20 belonging to the cell 10. The number of sectors 20 belonging to one cell 10 is subject to change. The BS 100 may operate multiple beams for the sectors 20 of the cell 10 individually. In order to support one or more MSs while acquiring the beamforming gain, the BS 100 simultaneously forms one or more transmit/receive beams for DL/UL in different directions, or sequentially forms the transmit/receive beams while sweeping them in different directions. As an example, the BS 100 simultaneously forms N receive beams 102 facing N directions during N slots. As another example, the BS 100 sequentially forms N receive beams facing N directions while sweeping them during N slots. Specifically, a first receive beam is formed only in a first slot, a second receive beam is formed only in a second slot, an i-th receive beam is formed only in an i-th slot, and an N-th receive beam is formed only in an N-th slot.

Compared with the BS 100, a MS 110 generally operates a wide beam width 112 supporting a low beam gain due to the structural constraints of the MS 110. Depending on the implementation of the MS 110, the MS 110 may support one or more transmit/receive beams for DL/UL.

Figure 2:
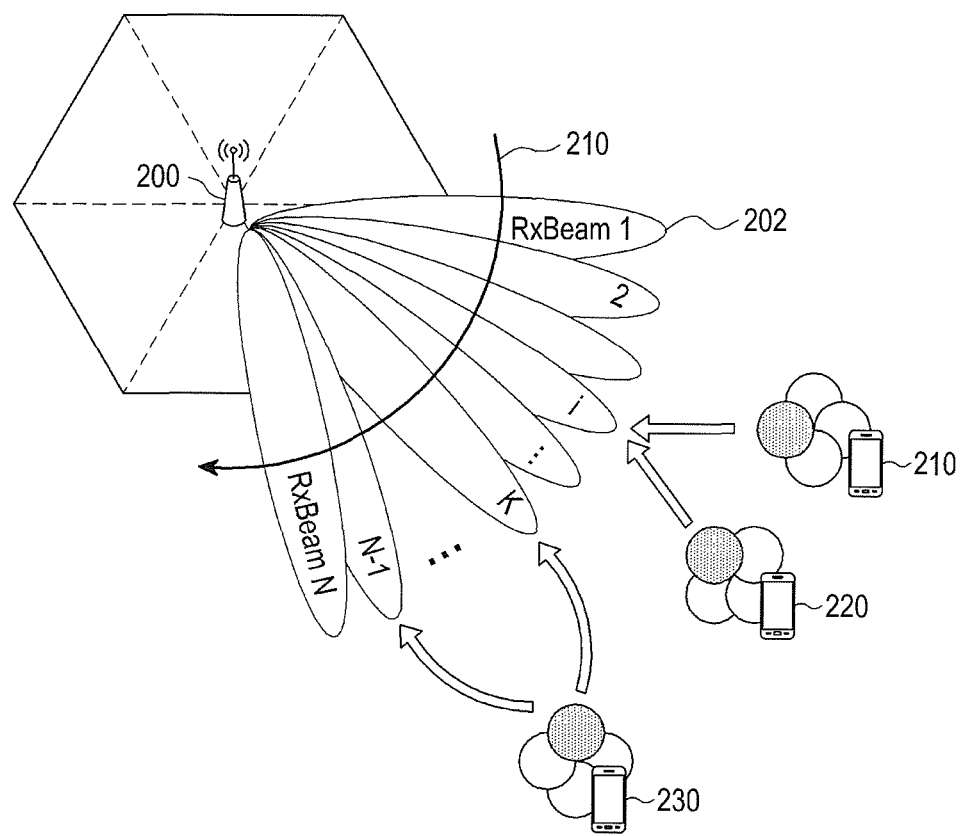
FIG. 2 illustrates beamforming-based communications between a BS and MSs according to an embodiment of the present disclosure.

FIG. 2 illustrates beamforming-based communications between a BS and MSs according to an embodiment of the present disclosure. It will be assumed that a BS 200 operates a plurality of receive beams 202 facing different directions for a UL within one sector, and MSs 210, 220 and 230 each support one or more transmit beams.

Referring to FIG. 2, the BS 200 may simultaneously receive a plurality of beam-formed signals (i.e., receive beams) in different directions, or may receive a plurality of signals through receive beams made by forming one or more receive beams facing different directions by sequentially sweeping them.

Depending on the implementation for acquisition of the maximum beamforming gain available under constraints caused by their shape and complexity, the MSs 210, 220 and 230 may support omni-directional transmission while not supporting transmit beamforming, may apply only one of specific beamforming patterns at a time during transmission while supporting transmit beamforming, or may simultaneously apply a plurality of transmit beamforming patterns in different directions while supporting transmit beamforming.

As for a MS (not shown) which does not support transmit beamforming, the BS 200 measures channel quality for a reference signal for each MS's transmit beam, and selects a beam best to the MS among a plurality of receive beams of the BS 200 based on the measurement results. In the example embodiment of the MSs 210, 220 and 230 supporting transmit beamforming, the BS 200 measures channel quality of each pair of a plurality of receive beams of the BS 200 for each transmit beamforming pattern of the MSs 210, 220 and 230, selects and manages the best one or some of, or all of the total pairs of BS receive beams and MS transmit beams, and schedules appropriate beam pairs for the MSs 210, 220 and 230 depending on the situation.

Under multiple access where the multiple MSs 210, 220 and 230 access the BS 200, a signal, for example, UL RNG or RACH may be used as a reference signal used to measure channel quality for each UL beam pair for the multiple MSs 210, 220 and 230, because the UL RNG or RACH uses a code or sequence randomly selected from multiple codes, and is operated based on the contention among multiple MSs.

The random code or sequence in UL RNG or RACH is designed considering UL multiple access of the multiple MSs and the BS 200 has the anonymous characteristics that the BS 200 cannot directly determine from which MS the detected code or sequence was transmitted. However, unlike in the existing wireless communication system, when the random code or sequence in UL RNG or RACH is used as a reference signal for a UL beamforming operation, a different code (or sequence) may be transmitted by being mapped to each UL beam of the MSs 210, 220 and 230 so as to distinguish one or more UL beams of the MSs 210, 220 and 230, which are transmitted sequentially or simultaneously, or a beam ID may be transmitted together with the code or sequence by being carried on each UL beam.

Figure 3:
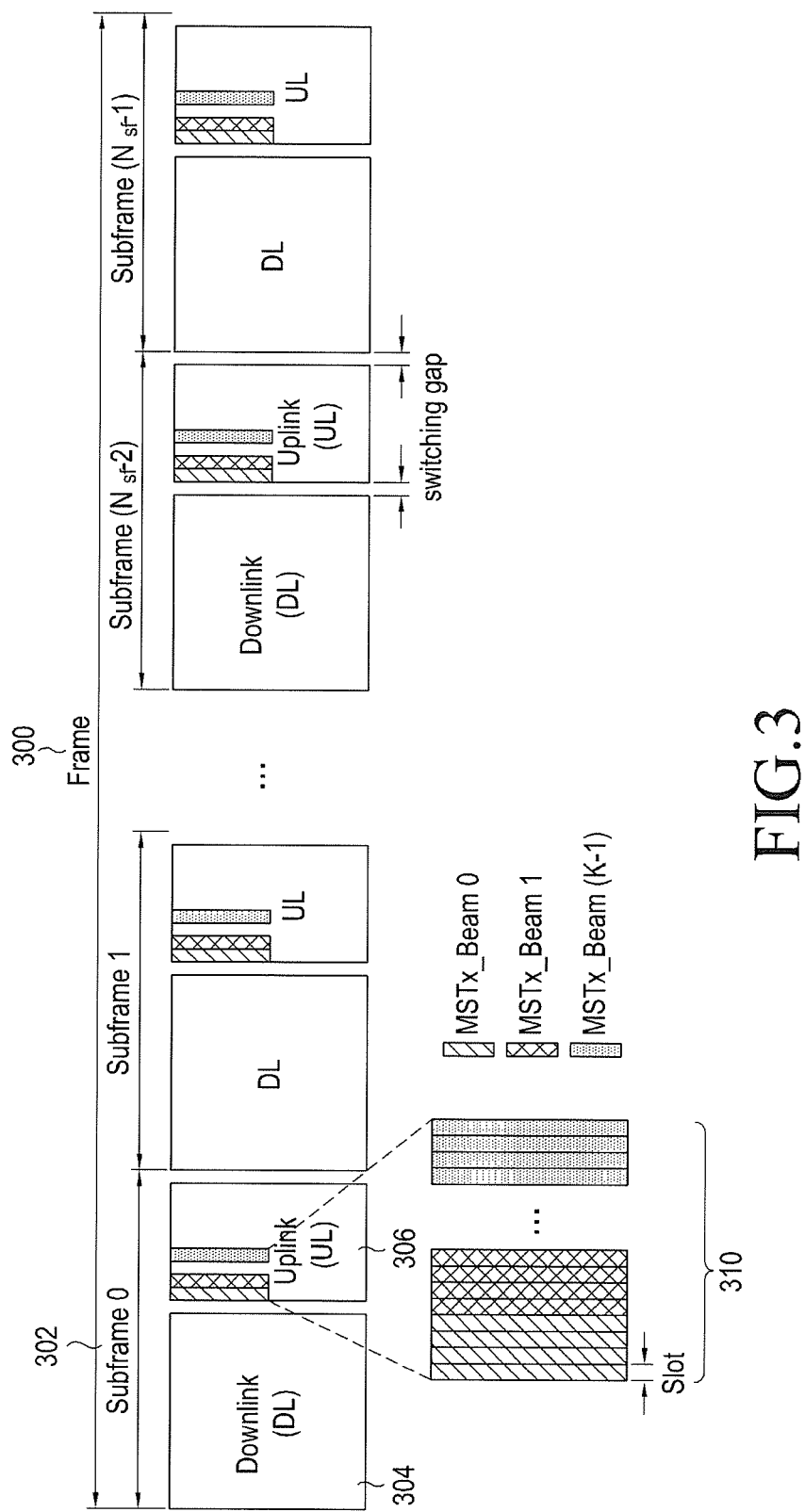
FIG. 3 illustrates a frame structure for UL beam tracking.

FIG. 3 illustrates a frame structure for UL beam tracking. Although an example of a Time Division Duplex (TDD) frame structure is shown herein, the frame structure may have a variety of forms depending on the duplex mode (i.e., Time Division Duplex (TDD), Frequency Division Duplex (FDD) or Half-duplex FDD (H-FDD)), the maximum number of MS transmit beams and BS receive beams, the reference signal type for each beam, the reference signal transmission cycle, and the like.

Referring to FIG. 3, a frame 300 consists of $N_{sf}$ subframes 302, and each subframe 302 includes a DL interval 304 and a UL interval 306, which are separated by a switching gap. A specific resource region 310 of each UL interval 306 is allocated for transmitting a ranging channel or RACH. MSs desiring to perform UL synchronization or perform transmission (Tx) adjustment with a BS during initial network entry may transmit a ranging code (or sequence) on a contention basis using the resource region 310. Specifically, each MS selects a ranging code mapped to each MS's transmit beam, and repeatedly transmits a signal capable of being distinguished for each of multiple MS transmit beams as many times as the number of BS's receive beams. The BS measures the channel state of each MS's transmit beam for each BS's receive beam.

As an example, a ranging code mapped to one MS transmit beam is repeatedly transmitted several times in units of slots, each of which is an interval in which a BS performs reception with a specific receive beam. Specifically, a first ranging code is repeatedly transmitted through a first MS transmit beam during a plurality of slots corresponding to the number, N, of BS receive beams. A second ranging code is repeatedly transmitted through a second MS transmit beam during N slots. Similarly, the same operation is repeated even for the other MS's transmit beams. To this end, the resource region 310 may be configured to include at least K*N slots depending on the number, K, of MS transmit beams and the number, N, of BS receive beams.

Figure 4:
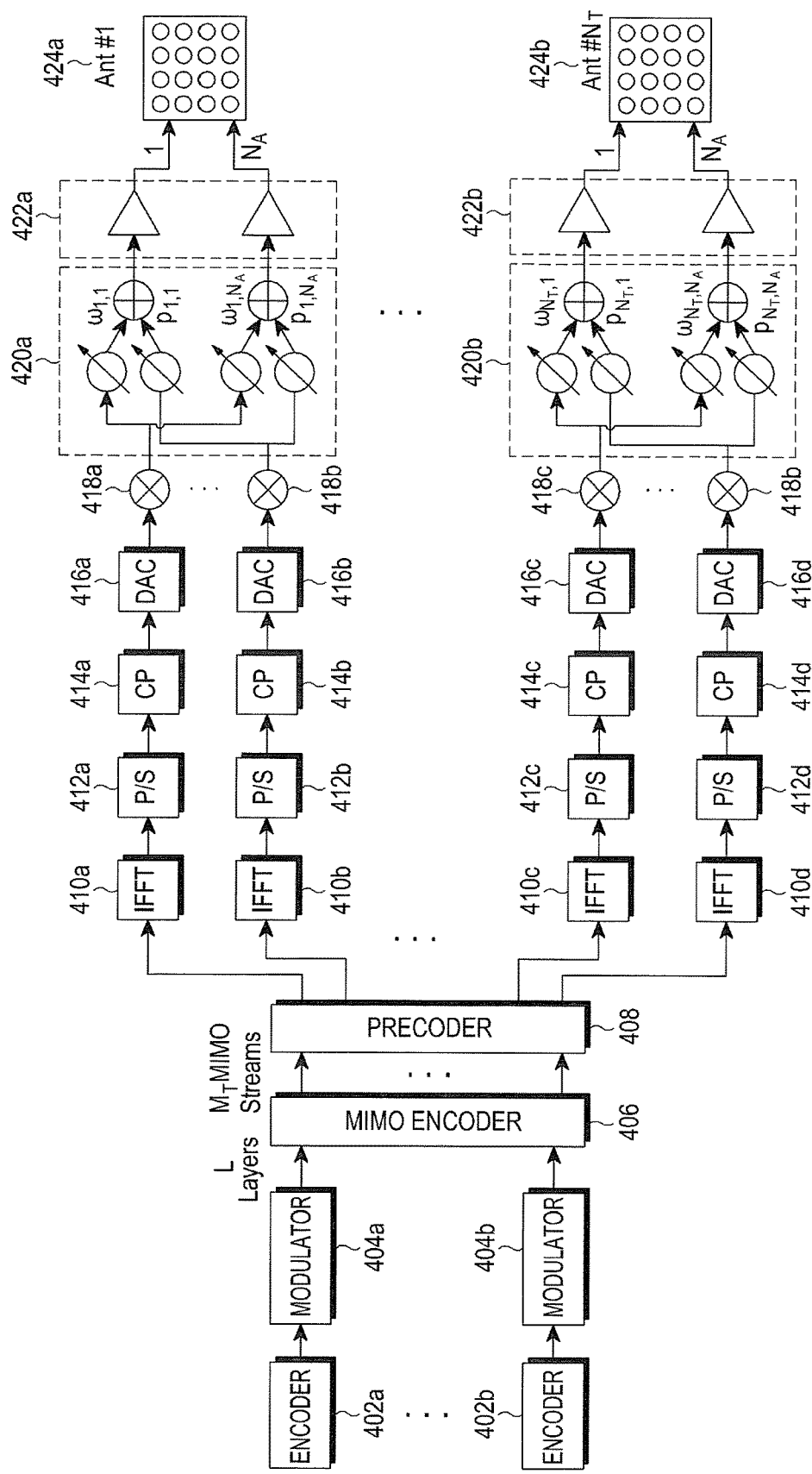
FIG. 4 illustrates a block diagram of a transmitter's physical (PHY) layer for supporting beamforming according to an embodiment of the present disclosure.

FIG. 4 illustrates a block diagram of a transmitter's physical (PHY) layer for supporting beamforming according to an embodiment of the present disclosure. As an example, a hybrid structure that applies both analog beamforming and digital beamforming will be considered to represent the general structure supporting beamforming.

Referring to FIG. 4, multiple encoders 402a and 402b encode input information corresponding to L layers, and multiple modulators 404a and 404b map the coded information to modulation symbols. A MIMO encoder 406 converts a modulation symbol sequence corresponding to L layers into $M_T$ MIMO streams, and a precoder 408 converts the MT MIMO streams into $N_T \times N_A$ pre-coded streams corresponding to $N_T$ antenna arrays 424a and 424b and $N_A$ antenna elements included in each antenna array using a predetermined precoding matrix.

The pre-coded streams are converted into analog signals after passing through Inverse Fast Fourier Transform (IFFT) units 410a, 410b, 410c and 410d, Parallel to Serial Converters (P/Ss) 412a, 412b, 412c and 412d, Cyclic Prefix (CP) inserters 414a, 414b, 414c and 414d, Digital to Analog Converters (DAC) 416a, 416b, 416c and 416d, and mixers 418a, 418b, 418c and 418d, and then the analog signals are input to phase shifters 420a and 420b and power amplifiers 422a and 422b.

The phase shifters 420a and 420b control phases ω and p of the input analog signals according to the $N_T$ antenna arrays 424a and 424b and the $N_A$ antenna elements, and the power amplifiers 422a and 422b control amplitudes of the phase-shifted signals according to the $N_T$ antenna arrays 424a and 424b and the $N_A$ antenna elements. The analog signals are formed into transmit beams having specific power in a specific direction by the phase shifters 420a and 420b and the power amplifiers 422a and 422b. The shown transmitter's structure may obtain additional beamforming gain by Radio Frequency (RF) paths that include IFFT units before the DACs, and the MIMO encoder 406 and the precoder 408, and may support functions such as multi-user operation, frequency-selective allocation, and multi-beamforming.

Figure 5:
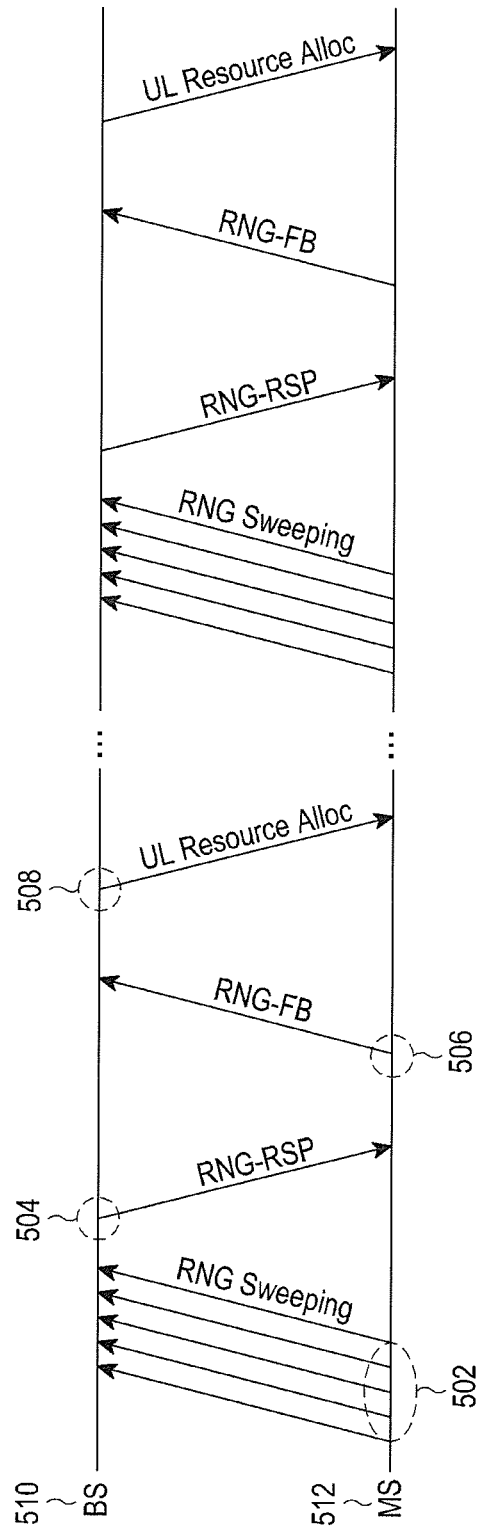
FIG. 5 illustrates a flow diagram of selecting and tracking UL transmit/receive beams according to an embodiment of the present disclosure.

FIG. 5 illustrates a flow diagram of selecting and tracking UL transmit/receive beams according to an embodiment of the present disclosure.

Referring to FIG. 5, a MS 512 supporting one or more transmit beams may perform beam tracking during the MS's 512 entry into the network connecting with a BS 510, after handover, or through a ranging process which is triggered periodically or aperiodically or by an event in a connected state. Specifically, in step 502, the MS 512 transmits a different ranging code for each of transmit beams while sweeping the transmit beams so that the BS 510 may perform channel measurement and select an best beam according to multiple transmit/receive beam pairs which are based on the number, K, of MS transmit beams and the number, N, of BS receive beams. Each ranging code is repeatedly transmitted through the ranging code's associated transmit beam as many times as the number, N, of BS receive beams. While sweeping BS receive beams, the BS 510 receives ranging codes, which are transmitted from the MS 512 through transmit beams over a resource region in a UIC, interval allocated for a ranging channel or RACH. However, as described above, the BS 510 may not identify an identity of the MS 512 that transmits ranging codes over the resource region, because the resource region and ranging codes are shared by multiple MSs on a contention basis.

In step 504, the BS 510 measures a channel state for each pair of BS receive beams and MS transmit beams using the ranging codes transmitted by the MS 512, selects one or more best beam pairs based on the measurement results, and delivers beam pair information indicating the selected M best beam pairs (where M is a positive integer greater than zero (0)) to the MS 512 using a DL message such as RNG-RSP. The RNG-RSP message includes an Identifier (ID) indicating at least one ranging code that the BS 510 has received, and the beam pair information includes a MS transmit beam identifier and a BS receive beam identifier for each best beam pair. As a possible option, transmit beam adjustment information indicating transmit timing and transmit power of the MS 512 for each best beam pair may be delivered together with the beam pair information. If MS transmit beams are mapped to different transmit timings, the transmit timings may be construed as MS transmit beam identifiers.

The BS 510, together with the ranging response, allocates UL resources, i.e., UL BW so that the MS 512 may send a UL feedback or a Ranging FeedBack (RNG-FB) message. For example, the allocation information for the UL BW may be included in the RNG-RSP message, or may be included in an independent message that is sent with the RNG-RSP message at the same time or almost simultaneously. The independent message may include an identifier of the ranging code that the BS 510 has received. As a possible option, instead of allocating by the BS 510 a UL BW using an RNG-RSP message in an unsolicited manner, the MS 512 may request UL resources from the BS 510 in a solicited manner through a predetermined process after receiving the RNG-RSP message.

In step 506, the MS 512 feeds back a UL message such as RNG-FB, which includes the best beam pair information indicating BS receive beams and MS transmit beams associated with one or more best beam pairs, which is received from the BS 510 in step 504, to the BS 510 using the allocated UL resources. The RNG-FB message may further include a MS identifier of the MS 512 so that the BS 510 may identify an identity of the MS 512. Based on the RNG-FB message, the BS 510 may fully identify the selected one or more best beam pairs and their associated MS 512 from the ranging codes that was anonymously received from the MS 512 in step 502. As a possible option, the MS 512 may feed back the best beam pairs, the number of which is less than M, to the BS 510 using an RNG-FB message.

In step 508, the BS 510 performs UL beam resource scheduling and resource allocation within appropriate beam pairs selected for the MS 512 based on the information received in step 506. Although not shown, if the BS 510 selects and operates a plurality of beam pairs and switches pairs of BS receive beams and MS transmit beams depending on the scheduling in the UL, the BS 510 may provide beam pair information indicating the switched beam pair to the MS 512. In response, the MS 512 performs UL transmission by applying transmit timing and transmit power appropriate for the switched beam pair based on the transmit beam adjustment information received in step 504.

Figure 6:
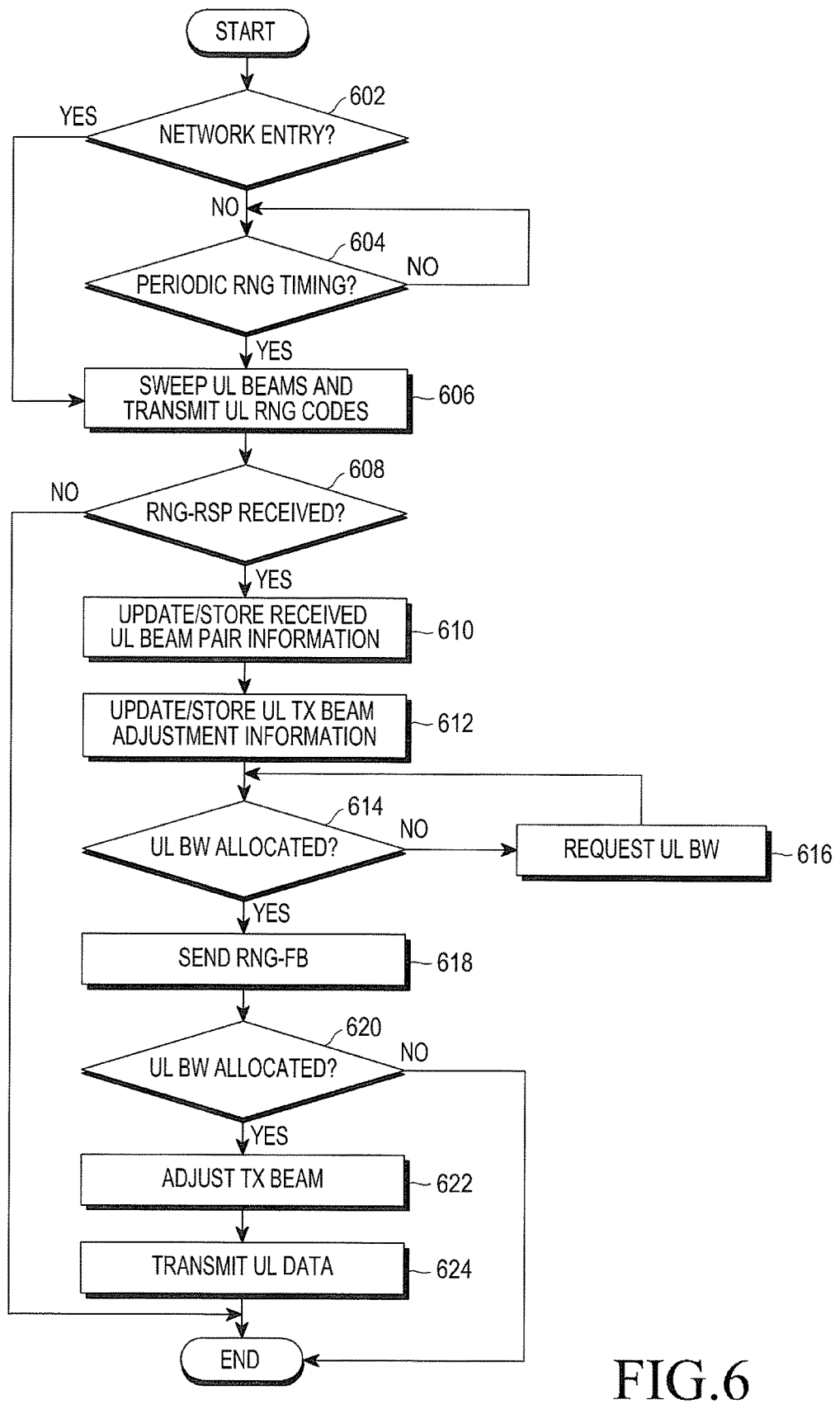
FIG. 6 illustrates a flowchart of an operation of tracking UL beams by a MS according to an embodiment of the present disclosure.

FIG. 6 illustrates a flowchart of an operation of tracking UL beams by a MS according to an embodiment of the present disclosure. An operation of selecting one or more best beam pairs by a MS is shown herein, and the shown operation may be performed periodically or aperiodically according to the predetermined period or predetermined conditions.

Referring to FIG. 6, the MS determines in step 602 whether a network entry procedure has been accomplished. If the network entry procedure has been accomplished, the MS goes to step 606 to perform UL beam sweeping. If the network entry procedure has not been accomplished, the MS determines in step 604 whether periodic Ranging (RNG) timing has come. If the periodic RNG timing has come, the MS goes to step 606 to perform UL beam sweeping.

In step 606, the MS repeatedly transmits each of K ranging codes mapped to K MS transmit beams N times while sweeping the K MS transmit beams, using the resource region in a UL interval, which is designated for a ranging channel or RACH. Thus, a BS may receive ranging codes transmitted through K MS transmit beams, through N BS receive beams, and measure a channel state for each beam pair.

The MS monitors in step 608 whether an RNG-RSP message including beam pair information indicating M best beam pairs selected by the BS is received from the BS in response to at least one of the ranging codes, and proceeds to step 610 if the RNG-RSP message is received. If the RNG-RSP message is not received that responds to at least one of the ranging codes that the MS has transmitted within a predetermined time, the MS may end or restart the beam tracking procedure, considering that the beam tracking procedure is failed.

In step 610, the MS stores beam pair information included in the RNG-RSP message, or updates previous beam pair information if there is pre-stored previous beam pair information. In step 612, the MS stores or updates transmit beam adjustment information, if the RNG-RSP message includes transmit beam adjustment information indicating transmit timing and transmit power for each best beam pair.

The MS monitors in step 614 whether allocation information for allocating a UL BW used to send an RNG-FB message is received from the BS, and proceeds to step 618 if the allocation information is received. As an example, the MS may determine whether the allocation information is included in the RNG-RSP message received from the BS. If the allocation information is not included in the RNG-RSP message or the allocation information is not received within a predetermined time, the MS send a UL BW request to the BS in step 616 and then returns to step 614. As a possible option, the MS may perform step 616 before performing step 614.

In step 618, the MS sends an RNG-FB message including best beam pair information indicating the M best beam pairs and a MS identifier, to the BS using the UL BW indicated by the allocation information. As a possible option, the MS may feed back best beam pairs, the number of which is less than M, to the BS using an RNG-FB message.

The MS monitors in step 620 whether resource allocation information is received that indicates UL resources allocated depending on BS's UL beam resource scheduling and one or more beam pairs allocated for UL transmission, and proceeds to step 622 if the resource allocation information is received. If the resource allocation information is not received within a predetermined time, the MS may end or restart the beam tracking operation, considering that they are excluded from scheduling.

In step 622, the MS determines transmit timing and transmit power corresponding to one or more beam pairs indicated by the resource allocation information based on the transmit beam adjustment information that the MS received and stored in step 612, and adjusts transmit timing and transmit power of the at least one beam pair depending on the transmit timing and the transmit power. In step 624, the MS transmits UL data using the adjusted one or more beam pairs.

Figure 7:
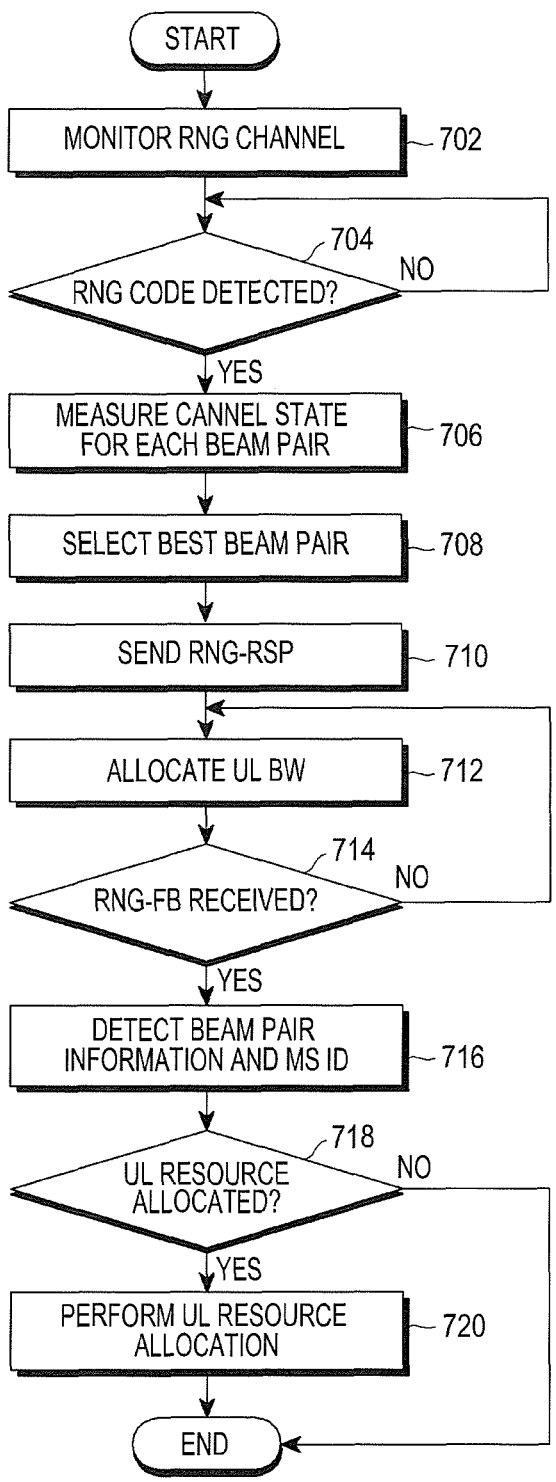
FIG. 7 illustrates a flowchart of an operation of tracking UL beams by a BS according to an embodiment of the present disclosure.

FIG. 7 illustrates is a flowchart of an operation of tracking UL beams by a BS according to an embodiment of the present disclosure.

Referring to FIG. 7, the BS monitors in step 702 whether there is a ranging code which is received over a ranging channel in a resource region of a UL interval, which is designated for a ranging channel or RACH. The BS determines in step 704 whether a ranging code is detected from the ranging channel, and proceeds to step 706 if the ranging code is detected.

In step 706, the BS receives K ranging codes transmitted through K MS transmit beams from a MS through each BS receive beam, while sweeping N BS receive beams, and measures a channel state for each beam pair. The BS selects M best beam pairs based on the measurement results for each beam pair in step 708, and transmits beam pair information indicating the M best beam pairs to the MS using an RNG-RSP message in step 710. The BS may further include, in the RNG-RSP message, transmit beam adjustment information indicating transmit timing and transmit power for the M best beam pairs. In step 712, the BS allocates a UL BW for transmission of a RNG-FB message, to the MS. As another example, the BS may transmit allocation information for the UL BW allocated the MS, to the MS using the RNG-RSP message.

The BS monitors in step 714 whether an RNG-FB message is received from the MS over the allocated UL BW, and proceeds to step 716 if the RNG-FB message is received. If no RNG-FB message is received within a predetermined time, the BS may return to step 712 to re-allocate the UL BW.

In step 716, the BS acquires the best beam pair information indicating the M best beam pairs and a MS identifier from the RNG-FB message, and recognizes that the M best beam pairs are appropriate for a MS having the MS identifier. The BS determines in step 718 whether to allocate resources for UL transmission to the MS by scheduling UL beam resources depending on the M best beam pairs for the MS, and proceeds to step 720 if the BS determines to allocate UL resources. The BS ends the operation if the BS does not allow UL transmission.

In step 720, the BS transmits, to the MS, resource allocation information indicating UL resources allocated according to UL beam resource scheduling and one or more beam pairs allocated for UL transmission, allowing the MS to perform UL transmission.

Figure 8:
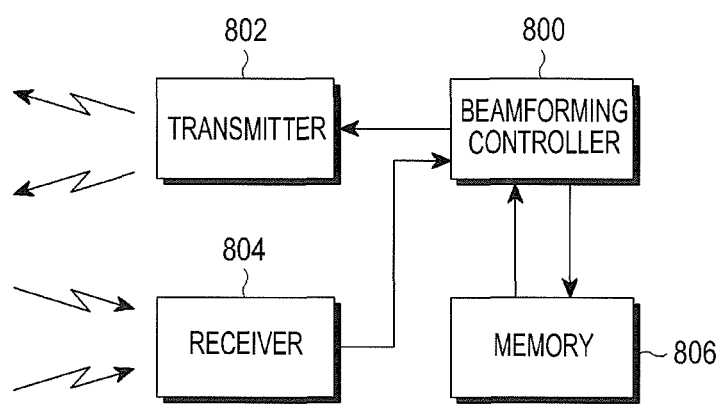
FIG. 8 illustrates a block diagram of a structure of a BS and a MS, provided to perform beam tracking according to an embodiment of the present disclosure.

FIG. 8 illustrates a block diagram of a structure of a BS and a MS, provided to perform beam tracking according to an embodiment of the present disclosure.

If the structure of FIG. 8 is applied to a MS, a transmitter 802, under control of a beamforming controller 800, repeatedly transmits a ranging code corresponding to each MS transmit beam while sweeping MS transmit beams, and transmits best beam pair information for one or more best beam pairs and a MS identifier, to a BS. A receiver 804, under control of the beamforming controller 800, receives beam pair information for one or more best beam pairs and transmit beam adjustment information, from the BS, and also receives, from the BS, allocation information for UL feedback and resource allocation information based on UL beam resource scheduling. The beamforming controller 800 controls operations of the transmitter 802 and the receiver 804, stores the beam pair information and transmit beam adjustment information received by the receiver 804 in a memory 806, and performs beamforming for UL transmission depending on the resource allocation information from the BS.

If the structure of FIG. 8 is applied to a BS, the receiver 804, under control of the beamforming controller 800, receives ranging codes transmitted through MS transmit beams while sweeping BS receive beams, and receives best beam pair information for one or more best beam pairs and a MS identifier, from a MS. The transmitter 802, under control of the beamforming controller 800, transmits beam pair information for one or more best beam pairs and transmit beam adjustment information, to the MS, and also transmits allocation information for UL feedback and resource allocation information based on UL beam resource scheduling, to the MS. The beamforming controller 800 controls operations of the transmitter 802 and the receiver 804, selects one or more best beam pairs by measuring a channel state for each beam pair from ranging codes received by the receiver 804, allocates UL BW for UL feedback; stores MS identifier and best beam pair information received from the MS, in the memory 806, and performs UL beam resource scheduling.

As is apparent from the foregoing description, according to the disclosed embodiments of the present disclosure, a wireless communication system operating based on beamforming supports technology for operating selection of UL MS transmit beams and BS receive beams using RING or RACH operated to support UL multiple access during a beamforming operation for acquisition of UL beam gain. In addition, the present disclosure efficiently enables UL beam tracking even if the beam pairs are switched through MS transmit beam adjustment that considers the UL multipath difference which is based on each pair of MS transmit beams and BS receive beams.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing a communication with a base station (BS) by a mobile station (MS) in a wireless communication system, the method comprising:

transmitting, by the MS, a plurality of ranging codes through MS transmit beams of the MS, wherein the plurality of ranging codes are mapped to the MS transmit beams allocated to different time slots, respectively, a ranging code mapped to an MS transmit beam among the plurality of ranging codes is repeatedly transmitted through the MS transmit beam during a plurality of time slots correspond to a number of BS receive beams of the BS, the MS transmit beam is one of the MS transmit beams, and the plurality of ranging codes are selected to be used for tracking the MS transmit beams from multiple ranging codes shared by multiple MSs based on a contention;

receiving, by the MS from the BS, time slot information related to at least one best MS transmit beam selected from the MS transmit beams, and allocation information of first uplink (UL) time-frequency resources, wherein the at least one best MS transmit beam is selected by the BS based on the plurality of ranging codes, and the first UL time-frequency resources are allocated to be used for transmitting best beam information;

transmitting, by the MS to the BS, the best beam information indicating the at least one best MS transmit beam identified by the time slot information and an MS identifier of the MS on the first UL time-frequency resources;

receiving, by the MS from the BS, resource allocation information indicating second UL time-frequency resources for UL data transmission and at least one MS transmit beam determined for the UL data transmission based on the at least one best MS transmit beam and the MS identifier, wherein the BS is configured to identify the MS having the at least one best MS transmit beam among the multiple MSs based on the MS identifier and allocate the second UL time-frequency resources to be used for the UL data transmission of the identified MS; and transmitting, by the MS to the BS, UL data on the second UL time-frequency resources using the at least one MS transmit beam determined for the UL data transmission.

2. The method of claim 1, further comprising receiving BS receive beam information indicating at least one best BS receive beam selected from the BS receive beams by the BS, together with the time slot information.

3. The method of claim 1, wherein the time slot information indicates transmit timing adjustment and transmit power for transmission of the at least one best MS transmit beam.

4. The method of claim 1, wherein the plurality of ranging codes are transmitted over a time-frequency resource region for a contention-based ranging process in a UL interval.

5. The method of claim 1, wherein the time slot information is received via a ranging response message.

6. The method of claim 5, wherein the ranging response message includes an identifier for a ranging code received at the BS among the plurality of ranging codes.

7. The method of claim 1, wherein the best beam information and the MS identifier are transmitted via a ranging feedback message.

8. A method for performing a communication with a mobile station (MS) by a base station (BS) in a wireless communication system, the method comprising:

receiving, by the BS, a plurality of ranging codes through MS transmit beams allocated to different time slots, wherein the plurality of ranging codes are mapped to the MS transmit beams of the MS, respectively, a ranging code mapped to an MS transmit beam among the plurality of ranging codes is repeatedly transmitted through the MS transmit beam during a plurality of time slots corresponding to a number of BS receive beams of a BS, the MS transmit beam is one of the MS transmit beams, and the plurality of ranging codes are selected to be used for tracking the MS transmit beams from multiple ranging codes shared by multiple MSs based on a contention;

selecting, by the BS, at least one best MS transmit beam among the MS transmit beams based on the received plurality of ranging codes and allocating first uplink (UL) time-frequency resources to be used for receiving best beam information from the MS;

transmitting, by the BS to the MS, time slot information related to the at least one best MS transmit beam and allocation information of the first UL time-frequency resources;

receiving, by the BS from the MS, the best beam information indicating the at least one best MS transmit beam identified by the time slot information and an MS identifier of the MS on the first UL time-frequency resources;

identifying, by the BS, the MS having the at least one best MS transmit beam among the multiple MSs based on the MS identifier and allocating second UL time-frequency resources to be used for UL data transmission of the identified MS;

transmitting, by the BS to the MS, information indicating the second UL time-frequency resources for UL data transmission and at least one MS transmit beam determined for the UL data transmission of the MS based on the at least one best MS transmit beam and the MS identifier; and receiving, by the BS from the MS, UL data on the second UL time-frequency resources, wherein the UL data is transmitted using the at least one MS transmit beam by the MS.

9. The method of claim 8, further comprising transmitting BS receive beam information indicating at least one BS receive beam selected from the BS receive beams by the BS, together with the time slot information.

10. The method of claim 8, wherein the time slot information indicates transmit timing adjustment and transmit power for transmission of the at least one best MS transmit beam.

11. The method of claim 8, wherein the plurality of ranging codes are received over a time-frequency resource region for a contention-based ranging process in a UL interval.

12. The method of claim 8, wherein the time slot information is transmitted via a ranging response message.

13. The method of claim 12, wherein the ranging response message includes an identifier for a ranging code received at the BS among the plurality of ranging codes.

14. The method of claim 8, wherein the best beam information and the MS identifier are received via a ranging feedback message.

15. A mobile station (MS) in a wireless communication system, the MS comprising:
a transceiver; and
a controller configured to control the transceiver;
wherein the transceiver is configured to:
transmit a plurality of ranging codes through MS transmit beams of the MS, wherein the plurality of ranging codes are mapped to the MS transmit beams allocated to different time slots, respectively, a ranging code mapped to an MS transmit beam among the plurality of ranging codes is repeatedly transmitted through the MS transmit beam during a plurality of time slots corresponding to a number of base station (BS) receive beams of a BS, the MS transmit beam is one of the MS transmit beams, and the plurality of ranging codes are selected to be used for tracking the MS transmit beams from multiple ranging codes shared by multiple MSs based on a contention;

receive, from the BS, time slot information related to at least one best MS transmit beam selected from the MS transmit beams, and allocation information of first uplink (UL) time-frequency resources, wherein the at least one best MS transmit beam is selected by the BS based on the plurality of ranging codes, and the first UL time-frequency resources are allocated to be used for transmitting best beam information;

transmit, to the BS, the best beam information indicating the at least one best MS transmit beam identified by the time slot information and an MS identifier of the MS on the first UL time-frequency resources;

receive, from the BS, resource allocation information indicating second UL time-frequency resources for UL data transmission and at least one MS transmit beam determined for the UL data transmission based on the at least one best MS transmit beam and the MS identifier, wherein the BS is configured to identify the MS having the at least one best MS transmit beam among the multiple MSs based on the MS identifier and allocate the second UL time-frequency resources to be used for the UL data transmission of the identified MS; and transmit, to the BS, UL data on the second UL time-frequency resources using the at least one MS transmit beam determined for the UL data transmission.

16. The MS of claim 15, wherein the transceiver further is configured to receive BS receive beam information indicating at least one best BS receive beam selected from the BS receive beams by the BS, together with the time slot information.

17. The MS of claim 15, wherein the time slot information indicates transmit timing adjustment and transmit power for transmission of the at least one best MS transmit beam.

18. The MS of claim 15, wherein the plurality of ranging codes are transmitted over a time-frequency resource region for a contention-based ranging process in a UL interval.

19. The MS of claim 15, wherein the time slot information is received via a ranging response message.

20. The MS of claim 19, wherein the ranging response message includes an identifier for a ranging code received at the BS among the plurality of ranging codes.

21. The MS of claim 15, wherein the best beam information and the MS identifier are transmitted via a ranging feedback message.

22. A base station (BS) in a wireless communication system, the BS comprising:
a transceiver; and
a controller configured to control the transceiver to:
receive a plurality of ranging codes through mobile station (MS) transmit beams of an MS, wherein the plurality of ranging codes are mapped to the MS transmit beams allocated to different time slots, respectively, a ranging code mapped to an MS transmit beam among the plurality of ranging codes is repeatedly transmitted through the MS transmit beam during a plurality of time slots corresponding to a number of BS receive beams of the BS, the MS transmit beam is one of the MS transmit beams, and the plurality of ranging codes are selected to be used for tracking the MS transmit beams from multiple ranging codes shared by multiple MSs based on a contention;

transmit, to the MS, time slot information related to at least one best MS transmit beam selected from the MS transmit beams based on the received plurality of ranging codes, and allocation information of first uplink (UL) time-frequency resources;

receive, from the MS, best beam information indicating the at least one best MS transmit beam identified by the time slot information and an MS identifier of the MS on the first UL time-frequency resources;

transmitting, to the MS, information indicating second UL time-frequency resources for UL data transmission and at least one MS transmit beam determined for the UL data transmission of the MS based on the at least one best MS transmit beam and the MS identifier of the MS;

receive UL data on the second UL time-frequency resources, wherein the UL data is transmitted using the at least one MS transmit beam by the MS, wherein the controller is configured to:
select the at least one best MS transmit beam among the MS transmit beams based on the received respective codes and allocate the first UL time-frequency resources to be used for receiving the best beam information from the MS; and identify the MS having the at least one best MS transmit beam among the multiple MSs based on the MS identifier and allocate the second UL time-frequency resources to be used for the UL data transmission of the identified MS.

23. The BS of claim 22, wherein the transceiver is configured to transmit BS receive beam information indicating at least one best BS receive beam selected from the BS receive beams by the BS, together with the time slot information.

24. The BS of claim 22, wherein the time slot information indicates transmit timing adjustment and transmit power for transmission of the at least one best MS transmit beam.

25. The BS of claim 22, wherein the plurality of ranging codes are received over a time-frequency resource region for a contention-based ranging process in a UL interval.

26. The BS of claim 22, wherein the time slot information is transmitted via a ranging response message.

27. The BS of claim 26, wherein the ranging response message includes an identifier for a ranging code received at the BS among the plurality of ranging codes.

28. The BS of claim 22, wherein the best beam information and the MS identifier are received via a ranging feedback message.

* * * * *